Jan. 17, 1928.

B. E. HILL 1,656,635

ILLUMINATED AUTOMOBILE LICENSE PLATE

Filed Dec. 22, 1926

INVENTOR
Birdie E. Hill
BY
ATTORNEY

Patented Jan. 17, 1928.

1,656,635

UNITED STATES PATENT OFFICE.

BIRDIE E. HILL, OF GUTHRIE, KENTUCKY.

ILLUMINATED AUTOMOBILE LICENSE PLATE.

Application filed December 22, 1926. Serial No. 156,373.

This invention relates to signs for automobiles and has for one of its objects the provision of an illuminated license plate.

Another object of the invention is the provision of a reflector for directing light against the rear surface of a translucent license plate.

A still further object of the invention is the provision of a translucent license plate having openings therein for permitting light directed by a reflector to be ejected therethrough.

Referring to the drawings.

Figure 1:
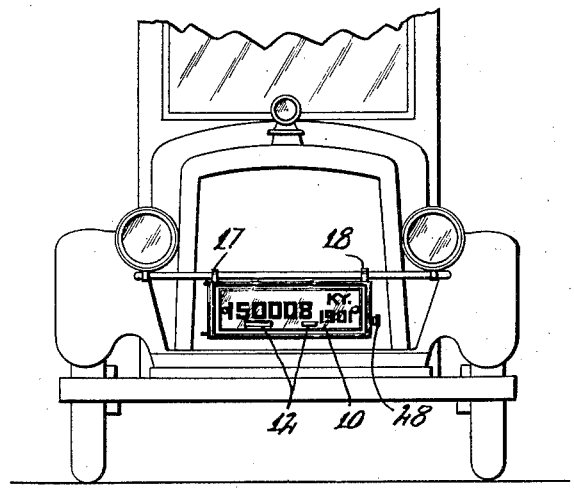
Fig. 1, is a perspective view of an automobile equipped with my improved license plate display device.
Figure 2:
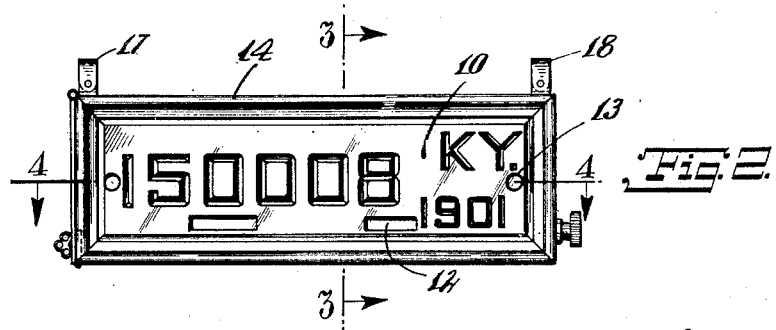
Fig. 2, is an enlarged elevational view of the license plate displaying device shown in Fig. 1.

Referring particularly to the drawing the numeral 10 designates a plate preferably of translucent glass having spaced bottom and side apertures 12 and 13 respectively. The plate 10 is mounted in an open side of a rectangular box 14 and is retained in vertical position by the rim 15 which engages the outer surface near the edges of the plate and the longitudinal angular braces 15 and 16 mounted on the inner surface of the top and bottom respectively of the box 14. Upon the plate 10 may be cut in and painted a license number or sign of any desired description. Clamping brackets 17 and 18 are rigidly mounted on the top of the box 14 adjacent the rear side thereof for attaching the device to an automobile as shown in Fig. 1.

Figures 3, 4:
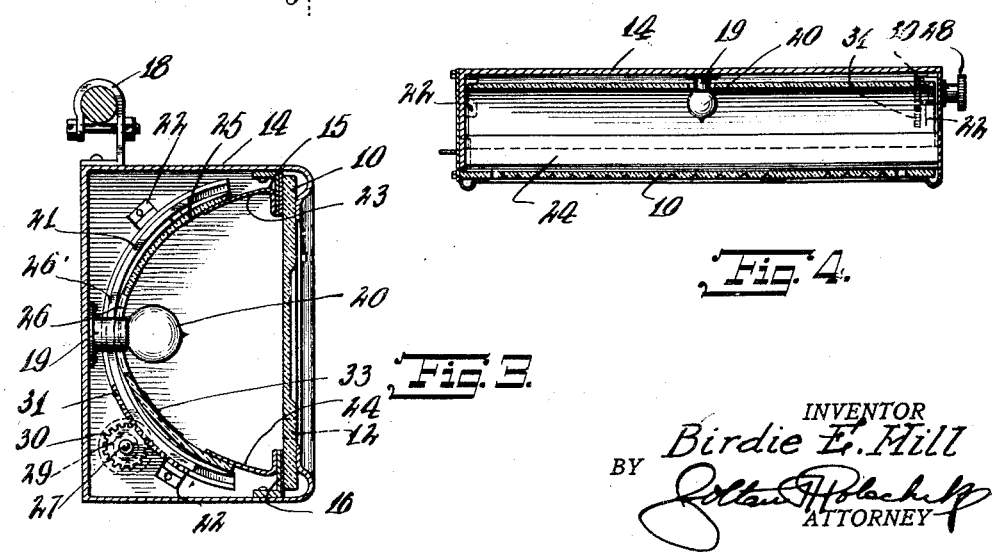
Fig. 3, is a transverse sectional view taken on the line 3—3 of Fig. 2.
Fig. 4, is a longitudinal sectional view taken on the line 4—4 of Fig. 2.

A bulb socket 19 is mounted at the central portion of the rear wall of the box 14 and is provided with a bulb 20 directed outwardly toward the translucent plate 10. Within the box 10 is adjustably mounted a reflector holder 21, slidably held by the angle brackets 22 mounted on the end of the box 11 and the longitudinal spring strips 23 and 24 mounted on the angle brackets 15 and 16 respectively. The spring strips 23 and 24 resiliently contact with the inner concave surface of a glass reflector member 25 mounted on the holder 21 as shown in Fig. 3. Slots 26 and 26' are provided in the reflector 25 and the holder 21 respectively to accommodate the socket 19 and are extended sufficiently to permit rotation of said reflector and holder. A shaft 27 is journaled in the right hand end of the box as viewed in Fig. 4 and is provided at its outer end with a knob or handle 28. To the inner end of the shaft 28 is rigidly attached a pinion 29 having teeth 30 thereon in mesh with the teeth 31 on the convex surface of the reflector holder 21. It should be understood that the reflector and holder therefor as shown in Fig. 3 are in their central position and that by rotation of the knob 28 and the pinion 30 connected therewith the reflector may be rotated in either a clockwise or anticlockwise direction as desired.

The light from the bulb 20 illuminates the interior of the box 14 and that portion of translucent plate 14 that is not painted or otherwise rendered opaque. The lettering may be applied to the exterior or interior surface of the plate 10 as desired. Thus the figures appear dark upon the illuminated background. The reflector 25 is provided with a lower reflecting surface 33 which is adapted to be adjustably positioned by manipulation of the pinion 29 to direct rays of the light through the lower slots 12 in the translucent plate 10 for projecting rays of light therethrough in advance of the automobile on the road upon which the car is running. It should be understood that the device may be mounted on the rear of the automobile if desired and in that case the rays of light would be directly behind the car.

Having thus fully shown and described an embodiment of my invention what is desired to be secured by Letters Patent of the United States is:

1. In a device of the class described, a license plate holder comprising a box having an open side, an adjustable reflector mounted in said box, a translucent plate disposed over the open side of said box having spaced lower apertures therein to permit direct ejection of rays of light through said translucent plate onto an automobile road, an electric light bulb in said box adapted to illuminate the interior thereof and said plate, spaced reflecting surfaces on said adjustable reflector adapted to direct rays of light through said lower apertures, and means for rotating said reflector to variably direct rays of light through said lower apertures.

2. In a device of the class described a license plate holder comprising a box, having an open side, a translucent plate having spaced lower openings therein, a concave reflector holder extending longitudinally of said box and adjustably mounted therein, a lamp mounted in said box and disposed between said reflector holder and said plate, a shaft journaled in said box, a handle mounted on the outer end of said shaft, a pinion rigidly mounted on the inner end of said shaft, teeth on the convex surface of said reflector holder adapted to mesh with the teeth of said pinion for adjustably positioning said reflector, a reflecting surface mounted on said reflector holder adapted to direct rays of light through said lower openings, said reflector holder being adjustable to variably direct rays of light through said lower apertures, and figures painted on said translucent plate adapted to be rendered conspicuous by illumination thereof.

In testimony whereof I have affixed my signature.

BIRDIE E. HILL.